(12) United States Patent
Borson et al.

(10) Patent No.: US 9,940,744 B2
(45) Date of Patent: Apr. 10, 2018

(54) REMOTE FONT MANAGEMENT

(71) Applicant: MICROSOFT TECHNOLOGY LICENSING, LLC, Redmond, WA (US)

(72) Inventors: Niklas Erik Borson, Langley, WA (US); Frank Dwayne Robinson, Redmond, WA (US); Worachai Chaoweeraprasit, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 177 days.

(21) Appl. No.: 14/486,764

(22) Filed: Sep. 15, 2014

(65) Prior Publication Data
US 2016/0078656 A1 Mar. 17, 2016

(51) Int. Cl.
| | |
|---|---|
| *G06T 11/60* | (2006.01) |
| *G09G 5/00* | (2006.01) |
| *G06K 9/62* | (2006.01) |
| *G06F 17/30* | (2006.01) |
| *G06F 17/21* | (2006.01) |

(52) U.S. Cl.
CPC ............ *G06T 11/60* (2013.01); *G06F 17/212* (2013.01); *G06F 17/214* (2013.01); *G06F 17/3028* (2013.01); *G06K 9/6201* (2013.01); *G09G 5/003* (2013.01); *G09G 2370/02* (2013.01)

(58) Field of Classification Search
CPC ............................ G06F 17/214; G06F 17/3028
See application file for complete search history.

(56) References Cited

U.S. PATENT DOCUMENTS

| | | | |
|---|---|---|---|
| 6,288,726 B1 | 9/2001 | Ballard | |
| 7,064,758 B2 | 6/2006 | Chik et al. | |
| 2004/0177056 A1 | 9/2004 | Davis et al. | |
| 2005/0080839 A1* | 4/2005 | Kuwata | G06F 17/214 709/200 |
| 2005/0275656 A1 | 12/2005 | Corbin et al. | |

(Continued)

OTHER PUBLICATIONS

Levantovsky, Vladimir, "Font Compression and Streaming", Published on: Jul. 2005, Retrieved from: <http://mpeg.chiariglione.org/standards/mpeg-4/font-compression-and-streaming> on Aug. 18, 2014, 5 pages.

(Continued)

*Primary Examiner* — Jeffrey Chow
(74) *Attorney, Agent, or Firm* — Jacob P. Rohwer; Newport IP, LLC

(57) ABSTRACT

Remote font management techniques are described. In one or more implementations, one or more layout tables are obtained, located remotely via a network by a computing device, that correspond to a font associated with a request to output text using the font. A layout and glyph dependencies of the text is generated by the computing device using the obtained one or more layout tables to identify glyphs that are involved in an output of the text. The identified glyphs are obtained by the computing device from a font file located remotely from the computing device via the network and the text is rendered by the computing device using the obtained glyphs.

20 Claims, 8 Drawing Sheets

(56) References Cited

U.S. PATENT DOCUMENTS

| | | | |
|---|---|---|---|
| 2006/0103653 A1 | 5/2006 | Chik et al. | |
| 2006/0170684 A1* | 8/2006 | Kobayashi | G06F 17/214 345/467 |
| 2008/0303822 A1 | 12/2008 | Taylor et al. | |
| 2010/0199174 A1 | 8/2010 | Leonov et al. | |
| 2010/0231598 A1* | 9/2010 | Hernandez | G06F 17/214 345/471 |
| 2010/0321393 A1 | 12/2010 | Levantovsky | |
| 2011/0090230 A1 | 4/2011 | Bacus et al. | |
| 2011/0115797 A1 | 5/2011 | Kaplan | |
| 2011/0126191 A1 | 5/2011 | Hughes et al. | |
| 2011/0225507 A1* | 9/2011 | Letocha | G06F 17/214 715/744 |
| 2012/0229517 A1* | 9/2012 | Plummer | G06F 17/214 345/660 |
| 2013/0215126 A1 | 8/2013 | Roberts | |
| 2015/0097842 A1* | 4/2015 | Kaasila | G06K 9/6215 345/471 |
| 2015/0234793 A1* | 8/2015 | Patel | G06F 17/214 715/269 |
| 2016/0078004 A1* | 3/2016 | Butler | G06F 21/10 715/269 |
| 2016/0078656 A1* | 3/2016 | Borson | G06F 17/214 345/472 |

OTHER PUBLICATIONS

Grigorik, Ilya, "Optimizing Web Font Rendering Performance", Published on: Jan. 31, 2014, Retrieved from: <https://www.igvita.com/2014/01/31/optimizing-web-font-rendering-performance/> on Aug. 18, 2014, 8 pages.

"Using Font Fallback", Published on: Apr. 28, 2012, Retrieved from: <http://msdn.microsoft.com/en-us/library/windows/desktop/dd374105(v=vs.85).aspx> on Aug. 21, 2014, 2 pages.

Henninger et al., "A knowledge-based design environment for graphical network editors," System Sciences, 1989. vol. II: Software Track, Proceedings of the Twenty-Second Annual Hawaii International Conference on Kailua-Kona, HI, USA Jan. 3-6, 1989, Washington, DC, USA,IEEE Comput. Soc. PR, US, pp. 881-891.

The PCT Search Report and Written Opinion dated Feb. 2, 2016 for PCT application No. PCT/2015/049872, 16 pages.

PCT Application No. PCT/US2015/049872, International Preliminary Report on Patentability, dated Dec. 1, 2016, 17 Pages.

"Second Written Opinion Issued in PCT Application No. PCT/US2015/049872", dated Aug. 18, 2016, 8 Pages.

EP 15767058.9-1507, Rule 161(1) and 162 EPC, mailed Apr. 24, 2017, 2 pages.

\* cited by examiner

REMOTE FONT MANAGEMENT

BACKGROUND

Fonts are used by computing devices to represent text using particular sizes, weights, and styles of a typeface, such as to print text using a printer, show the text on a display device, and so on. Fonts may also be generated having different treatments, e.g., italics, bold, and so forth.

Users may have access to thousands of fonts that may be utilized to support rich display of the text. However, storage and communication of these fonts to the user as well as other users wishing to view the text using that font (e.g., a document having a particular font specified) may consume a significant amount of resources of the computing device, which may be exacerbated by fonts that support viewing of hundreds and even thousands of characters.

SUMMARY

Remote font management techniques are described. In one or more implementations, one or more layout tables are obtained, located remotely via a network by a computing device, that correspond to a font associated with a request to output text using the font. A layout of the text is generated by the computing device using the obtained one or more layout tables to identify dependent glyphs that are involved in an output of the text. The identified glyphs are obtained by the computing device from a font file located remotely from the computing device via the network and the text is rendered by the computing device using the obtained glyphs.

In one or more implementations, data related to a request regarding a first font from a first font file is obtained by a computing device. The first font file is accessible remotely by the computing device via a network and the request involves a display of text. A second font is selected by the computing device having at least portions of a corresponding second font file stored locally at the computing device that are usable as a substitution for the data of the requested first font. The text is rendered in the selected second font using the portions of the corresponding second font file during at least a portion of a period of time during which the obtaining of the data that is accessible remotely by the computing device is not available locally for rendering of the text. Responsive to accessibility of the obtained data locally at the computing device to render the text, the text is rendered using the obtained data.

In one or more implementations, a system includes one or more modules implemented at least partially in hardware. The one or more modules are configured to perform operations including obtaining one or more layout tables, located remotely via a network, that correspond to a font associated with a request to output text using the font and generating a layout of the text using the obtained one or more layout tables to identify dependent glyphs that are involved in an output of the text. The operations also include responsive to the generating, obtaining the identified glyphs from a font file located remotely from the computing device via the network and rendering the text using the obtained glyphs.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

DETAILED DESCRIPTION

Overview

Figure 1:
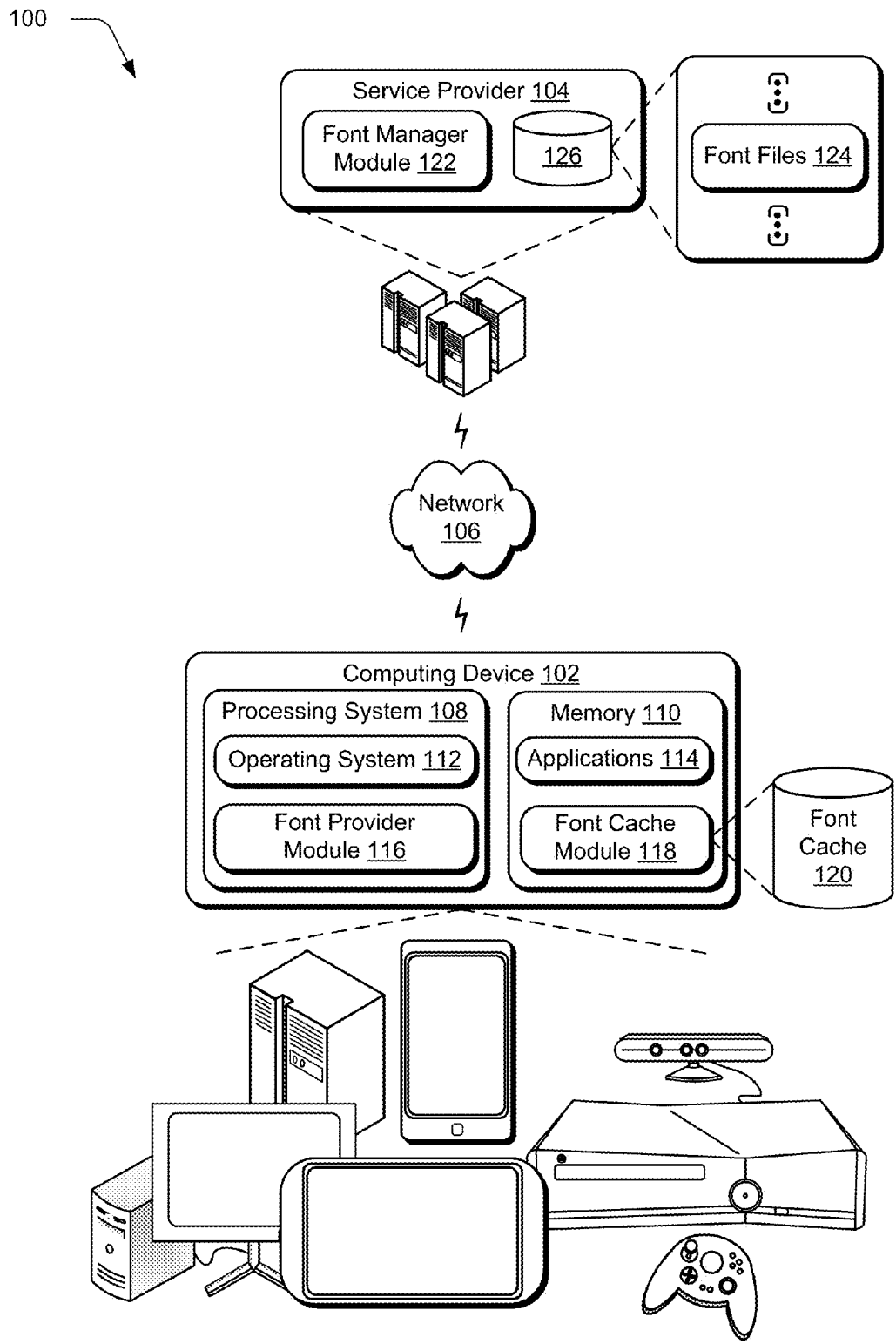
FIG. 1 is an illustration of an environment in an example implementation that is operable to employ the font management techniques described herein.

The variety of fonts is ever increasing and thus so too is the amount of resources consumed in storing and communicating these fonts using conventional techniques. Accordingly, font management techniques are described that may be configured to leverage network storage in communication and distribution of data related to fonts in a manner that may be utilized to conserve computing device and network resources.

For example, a font provider module may be employed (e.g., as a plug-in software component) to download metadata for the font set and font file data, such as layout tables. The font provider module may be configured to first download metadata related to a font to be used to display a particular selection of text, e.g., a document, webpage, and so on. The metadata may then be used to as part of font matching to identify a font and a corresponding font file.

Identification of the font file may then be used to obtain one or more layout tables that are usable to generate a layout of the font as applied to the text to identify glyphs that are to be involved in rendering the text through building a glyph dependency graph from the layout tables. These identified glyphs may then be obtained remotely via the network and saved in a sparse file format for use in rendering the text and may also be employed as part of a cross-process font cache for use in rendering of other text. In this way, the computing device may obtain glyphs from a font file that are to be utilized without obtaining glyphs that are not to be used, thereby conserving network and computing device resources in obtaining and storing font related data.

Additionally, fallback techniques may also be employed, such as to substitute a locally available font while obtaining the metadata, glyphs, and so on as described above. Thus, a user may view the text without waiting for the font-related data to be obtained and once obtained, the text may be rendered using the obtained data. Further discussion of these and other features may be found in the following sections.

In the following discussion, an example environment is first described that may employ the techniques described herein. Example procedures are then described which may be performed in the example environment as well as other environments. Consequently, performance of the example procedures is not limited to the example environment and the example environment is not limited to performance of the example procedures.

The following discussion describes remote font management techniques that may be implemented utilizing the previously described systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. In portions of the following discussion, reference will be made to the figures described above.

Functionality, features, and concepts described in relation to the examples of FIGS. 1-7 may be employed in the context of the procedures described herein. Further, functionality, features, and concepts described in relation to different procedures below may be interchanged among the different procedures and are not limited to implementation in the context of an individual procedure. Moreover, blocks associated with different representative procedures and corresponding figures herein may be applied together and/or combined in different ways. Thus, individual functionality, features, and concepts described in relation to different example environments, devices, components, and procedures herein may be used in any suitable combinations and are not limited to the particular combinations represented by the enumerated examples.

Example Environment

FIG. 1 is an illustration of an environment 100 in an example implementation that is operable to employ font management techniques described herein. The illustrated environment 100 includes a computing device 102 that is communicatively coupled to a service provider 104 (e.g., a web service) via a network 106. The computing device 102 as well as computing devices that may implement the service provider 104 may be configured in a variety of ways.

For example, a computing device may be configured as a computer that is capable of communicating over the network 106, illustrated examples of which include a desktop computer, a mobile station, an entertainment appliance, a set-top box communicatively coupled to a display device, a wireless phone, a game console, and so forth. Thus, the computing device 102 may range from full resource devices with substantial memory and processor resources (e.g., personal computers, game consoles) to a low-resource device with limited memory and/or processing resources (e.g., traditional set-top boxes, hand-held game consoles). Additionally, although a single computing device 102 is shown, the computing device 102 may be representative of a plurality of different devices, such as multiple servers utilized by a business to perform operations such as by the service provider 104, a remote control and set-top box combination, an image capture device and a game console configured to capture gestures, and so on.

Although the network 106 is illustrated as the Internet, the network may assume a wide variety of configurations. For example, the network 106 may include a wide area network (WAN), a local area network (LAN), a wireless network, a public telephone network, an intranet, and so on. Further, although a single network 106 is shown, the network 106 may be configured to include multiple networks.

The computing device 102 is illustrated as including a variety of hardware components, examples of which include a processing system 108, an example of a computer-readable storage medium illustrated as memory 110, may also include a display device as shown in the illustrated examples, and so on. The processing system 108 is representative of functionality to perform operations through execution of instructions stored in the memory 110. Although illustrated separately, functionality of these components may be further divided, combined (e.g., on an application specific integrated circuit), and so forth.

The computing device 102 is further illustrated as including an operating system 112. The operating system 112 is configured to abstract underlying functionality of the computing device 102 to applications 114 that are executable on the computing device 102. For example, the operating system 112 may abstract processing system 104, memory 106, network connection, and/or display device functionality of the computing device 102 such that the applications 114 may be written without knowing "how" this underlying functionality is implemented. The application 114, for instance, may provide data to the operating system 112 to be rendered without understanding how this rendering will be performed. The operating system 112 may also represent a variety of other functionality, such as to manage a file system and user interface that is navigable by a user of the computing device 102.

The computing device 102 is also illustrated as including a font provider module 116, a font cache module 118, and a font cache 120. The service provider 104 is illustrated as including a font manager module 122 and one or more font files 124 included in storage 126. Together, the functionality represented by these components may be utilized to minimize resource consumption of the computing device 102, yet still provide access to a large library of fonts. This means that the same text may be reproduced accurately on different classes of devices as illustrated, independent of what fonts are installed locally on each device.

Existing approaches to reproduce document fidelity have either embedded fonts along with the document or referred to external resources. The embedding approach, however, increases a storage size of documents. While this may be mitigated by creating a subset version of the font, this subset is a new distinct resource with different character support and a different layout from the original file, meaning caching logic is defeated in this existing approach. Further, because the subset does not contain full coverage of the original font, any additional editing to the document may miss characters, thereby making embedding in this existing approach a view-only solution.

For web documents, existing approaches typically refer to custom fonts via a URL using a cascading style sheet (CSS), which may work well for webpages and web applications based on an assumption that the consumer has a live network connection. However, this conventional CSS solution targets content inside a browser, solely. Additionally, a potentially large file is downloaded in each instance because existing system API's are designed to consume and expect an entire file at once.

Although compression techniques may be used to reduce file sizes, use of an entire file may involve hundreds and even thousands of characters in some instances. Creation of subsets may also be applied to web fonts to reduce size and bandwidth, however selecting which characters are to be used to create the subsets may be more complex with a website compared to a single stand-alone document, as websites may contain a multitude of webpages, a variety of languages, and even dynamic content. Further, dealing with multiple subset variants may also complicate the CSS and slow down the matching process in the browser using this conventional technique.

In addition to reproducing the fidelity of a single known font resource, it may also be desirable to support an ability to discover which additional font resources are available for selection. Although some existing approaches support an ability to query web API's and directly enumerate and download available font resources, this functionality is limited to an application itself that performs the download and then either globally installs the font or uses it in-process, solely. Local installation means this font is now permanently installed with no automated cleanup management available to tell the user which fonts came from where in this conventional technique. On the other hand, conventional in-process usage does not support cross-process sharing benefits and may involve redundant bandwidth from each application on a computing device than is to use the same resource.

Accordingly, the illustrated environment 100 may be configured to support a variety of functionality that may address and overcome these conventional limitations. For example, the font provider module 116 may be configured as a plug-in software component that may be used to download metadata and other data such a layout tables from font files 124 remotely via the network 106, which may be used to extend font streaming to support different font services.

The font cache module 118 may be utilized to support cross-process font cache functionality such that font set metadata, layout tables, and glyphs may be downloaded once from the service provider 104 and used by multiple applications 114. For example, metadata and/or layout tables from the font files 124 may be downloaded separately from glyphs of the font files 124, and even individual glyphs themselves may be downloaded as needed instead of an entire font file 124. The font cache module 118 may then track which parts of the font files 124 are local and communicate with the font provider module 116 to obtain any desired parts. Further, this data may be stored using a non-blocking design with font fallback and a font download queue that may leverage sparse files to conserve storage space.

Further, download requests can include files and file ranges, and also higher-level information such as characters and glyphs. For example, identification of which glyphs to download may be performed using a dependency graph and thus may be used to improve efficiency of the download. Font streaming, for instance, may use information about Unicode and about font formats to intelligently convert character requests to glyph requests and glyph requests to file range requests. This may also take into account glyph substitutions and additions that may occur during text layout, and may consolidate ranges of related characters (such as Arabic) to avoid inconsistent appearance due to partial font fallback.

Figure 2:
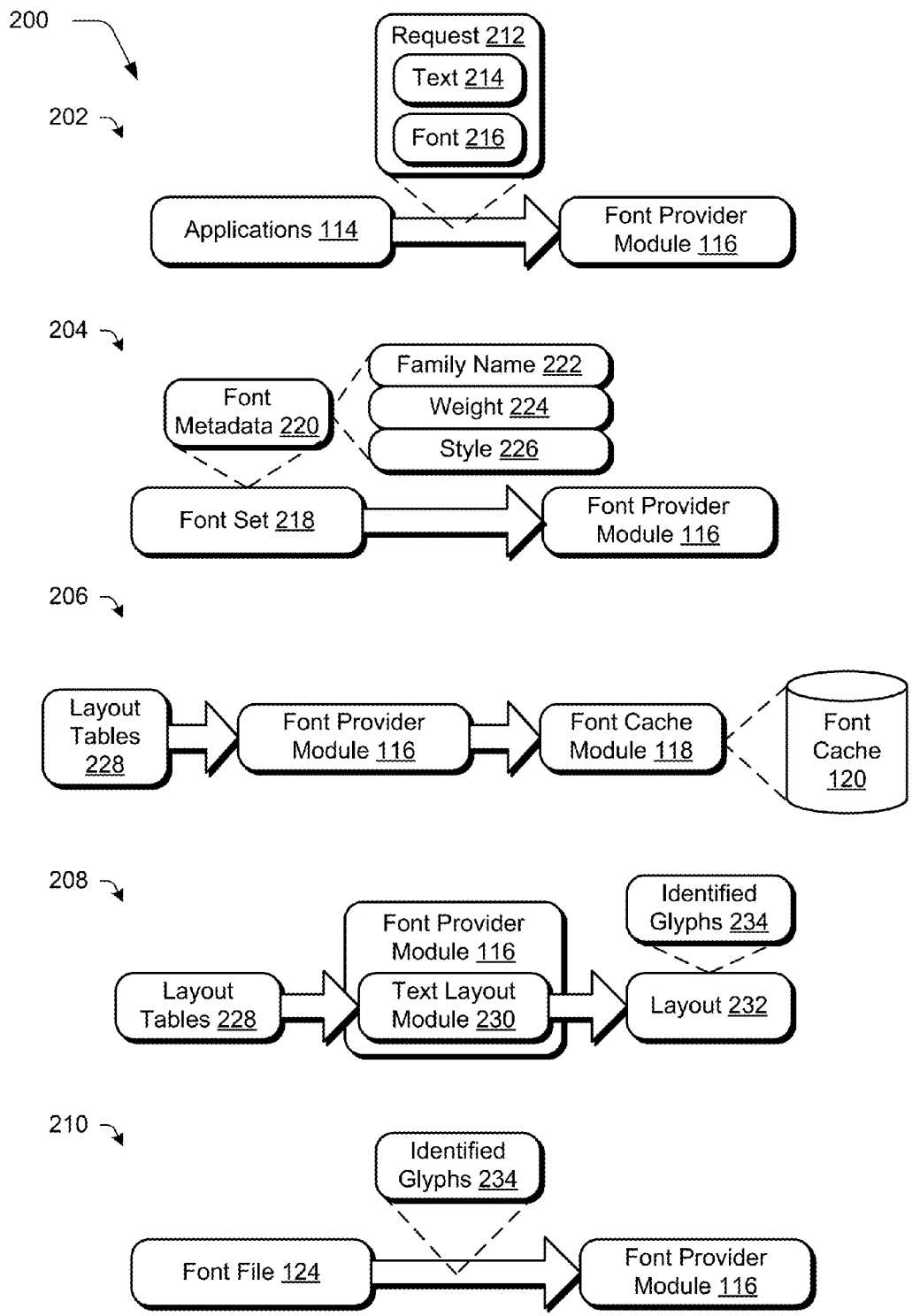
FIG. 2 depicts a system in an example implementation in which font-related data is streamed via a network to a computing device for use in rendering text.
Figure 3:
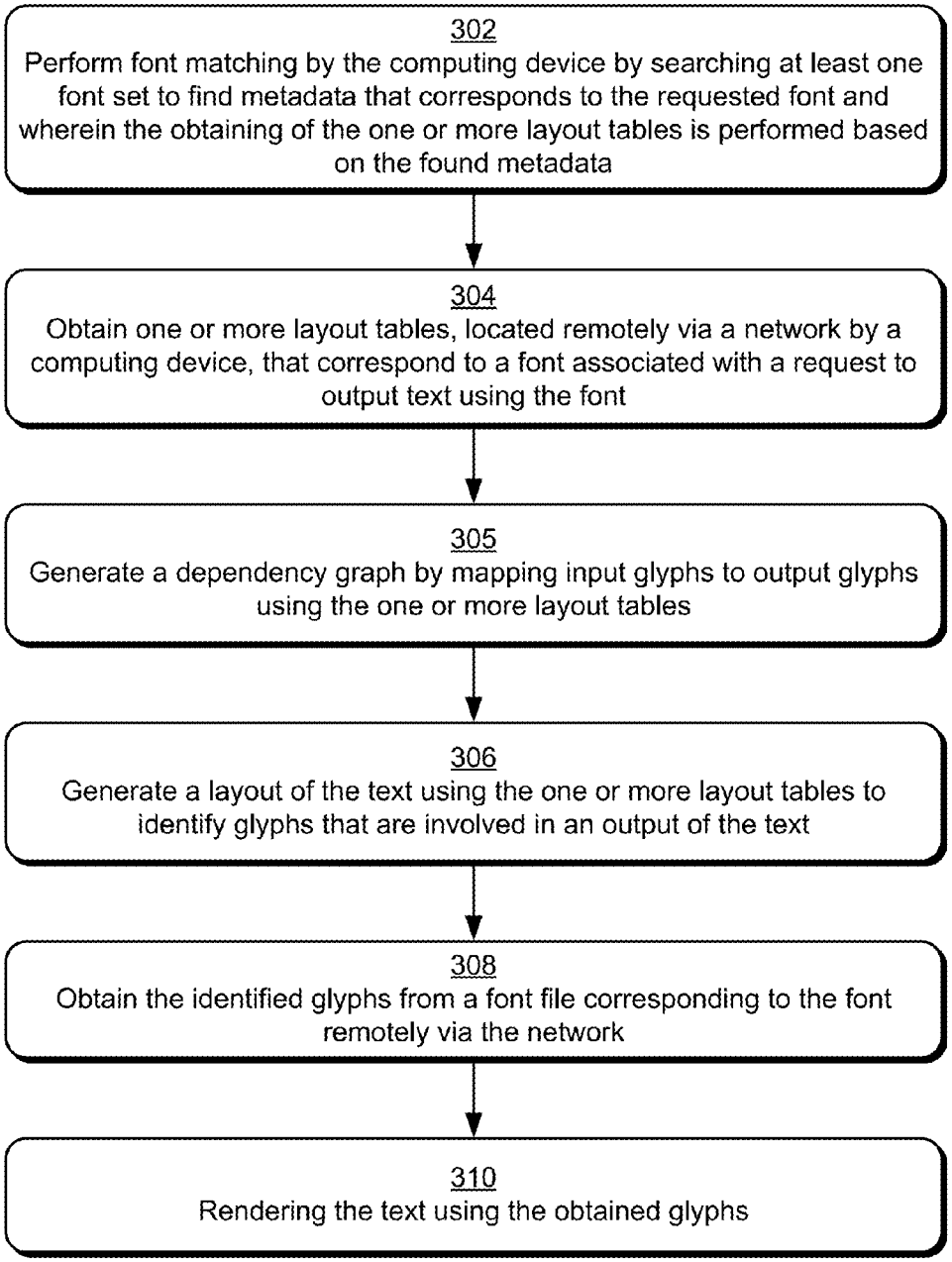
FIG. 3 is a flow diagram depicting a procedure in an example implementation in which a layout is generated using one or more layout tables to identify which glyphs to obtain by a computing device to render text.

FIG. 2 depicts a system 200 in an example implementation in which font-related data is streamed via a network to a computing device for use in rendering text. FIG. 3 depicts a procedure 300 in an example implementation in which a layout is generated from one or more layout tables to identify which glyphs to obtain by a computing device to render text. Discussion of both of these figures is performed in parallel in the following.

A font is represented by a file, a set of files, or part of a file. An example of a standard file format for fonts is OpenType. An OpenType font file includes a set of named data structures called tables, each of which has its own layout and purpose. For example, a "name" table specifies strings such as the font's family name (e.g., "Helvetica"); a "cmap" table maps standard Unicode characters to font-specific shapes called glyphs; a "gsub" table specifies context-based glyph substitutions (e.g., an fi ligature instead of separate f and i glyphs); and a "glyf" table contains geometric descriptions of the glyph shapes. In the following, font streaming techniques are described in reference to use with an OpenType format, but it should be readily apparent that these techniques are equally applicable to other font formats.

Text is typically represented in an application or document as a string of Unicode characters along with associated properties, such as font family name, font weight (e.g., bold), font style (e.g., italic), font size (e.g., 12 point). Additional properties may include paragraph alignment and justification, typographic features like small caps and old-style numerals, and many others.

Example stages that are performable to render text are shown in FIG. 2 through use of first, second, third, fourth, and fifth stages 202, 204, 206, 208, 210. At the first stage 202, a request 212 is received by a font provider module 116 from applications 114 to render text 214 according to a particular font 216. As previously described, the font provider module 116 may be configured as a plug-in component that is accessible by a plurality of applications 114, e.g., as part of the operating system 112. Other examples are also contemplated, such as to incorporate functionality of the font provider module 116 as part of the applications 114 themselves, and so on.

At the second stage 204, responsive to the request 212 to output text 214 in the font 216, at least one font set 218 is obtained from the service provider 104 that corresponding to the requested font remotely via a network. The font set 218, for instance, may include font metadata 220 such as a family name 222, weight 224, style 226, and so on. In this way, the font metadata 220 is communicated separately from the fonts themselves via the network 106 and thus may be utilized to improve efficiency and conserve network 106 as well as computing device 102 resources.

Font matching may then be performed by searching the at least one font set to find metadata that corresponds to the requested font (block 302) and thus may be used to identify a font file that corresponds to the requested font. For font matching, input properties of text 214 from the request 212 such as family name, weight, and style, are compared with the properties of available fonts as specified in the font metadata 220 of the font set 218 to find the closest match.

The font set 218 is initially populated by a font provider module 116 to obtain the font metadata 220 without actually downloading each of the fonts in the set. For example, the font provider module 116 may download a single file in JavaScript® Object Notation (JSON) or another format that contains font metadata 220 for a large number of fonts.

Once a font set 218 has been initialized, the font cache module 120 may cache the font set 218 in a font cache 120 for subsequent reuse. Therefore, when individual font files are needed later by the application 114 or other applications, these are also downloaded by the font provider module 116 and cached by the font cache module 118 in the font cache 120.

At a third stage 206, one or more layout tables are obtained, that are located remotely via a network by a computing device, that correspond to a font associated with a request to output text using the font (block 304). Continuing with the previous example, the font metadata 220 may be utilized to locate a particular font file 124 that corresponds to the requested font 216. Layout tables 228 from the font file 124 may then be obtained remotely via the network 106, and also provided to the font cache module 118 for storage in the font cache 120, e.g., for use by other applications.

At the fourth stage 208, a layout and glyph dependencies of the text is generated using the found layout tables 228 to identify glyphs that are involved in an output of the text. For example, a dependency graph may be generated by mapping input glyphs to output glyphs using the one or more layout tables (block 305). Additionally, a layout of the text may be generated using the dependency graph to identify glyphs that are involved in an output of the text (block 306).

A text layout module 230, for instance, is illustrated that is representative of functionality that may accept as an input the layout tables 228 to generate a layout 230 of the text 214, which may be performed using a dependency graph as described below. Thus, the text layout module 228 may leverage the layout tables 228 to determine the layout 232 of text 214 and dimensions to identify glyphs 234 to be used in the rendering of the text without actually downloading those glyphs by building a glyph dependency graph.

For example, the text layout module 230 may map character codes to glyph IDs, which are font specific representations of characters. Glyph positions are also computed as part of the layout 232 using metrics in the font. Other glyphs may be substituted for the nominal glyphs based on the text properties, the script (e.g., Arabic), and information in the font. Additionally, line breaking may be performed, and glyphs may be added as a result of hyphenation (e.g., the hyphen character) and justification (e.g., connecting characters for scripts like Arabic). Thus, the layout 232 as output by the text layout module 230 be used to identify glyphs 234 to be rendered, along with their respective positions in the layout 232 of the text 214.

At the fifth stage 210, the identified glyphs 234 are obtained from a font file 124 corresponding to the font remotely via the network 106 (block 308), e.g., from the service provider 104. Thus, the glyphs 234 that are actually identified as being used for rendering of the text 214 are obtained without obtaining glyphs that are not used, thereby conserving network 106 and computing device 102 resources.

The text is then rendered using the obtained glyphs (block 310). As described above glyph IDs produced by the text layout process are used to locate glyph data in the font. The glyph data typically specifies a shape of a glyph's outline as a series of curves. It may also include hinting instructions to optimize the shape for different sizes or resolutions. Some fonts use TrueType outlines and hints in the "glyf" table while others use PostScript outlines and hints in the "CFF" table. Additionally, fonts may contain glyph bitmaps for specific sizes. Further, rendering a glyph may depend on other glyphs because: (1) a TrueType glyph may be defined as a composite of other glyphs, and (2) a multi-color glyph may defined by layering glyphs of different colors on top of each other.

Thus, in this example the font provider module 116 and font cache module 118 in conjunction with remote storage of font files 124 via a service provider 104 may efficiently communicate and manage which data is communicated and maintained to render text in a particular font without obtaining data that is not used in this rendering. Because this data may be streamed via the network 106 from the service provider 104 to the computing device 102, fallback techniques may be employed to decrease delay in output of the text for viewing by a user, further discussion of which may be found in the following description and is shown in corresponding figures.

Figure 4:
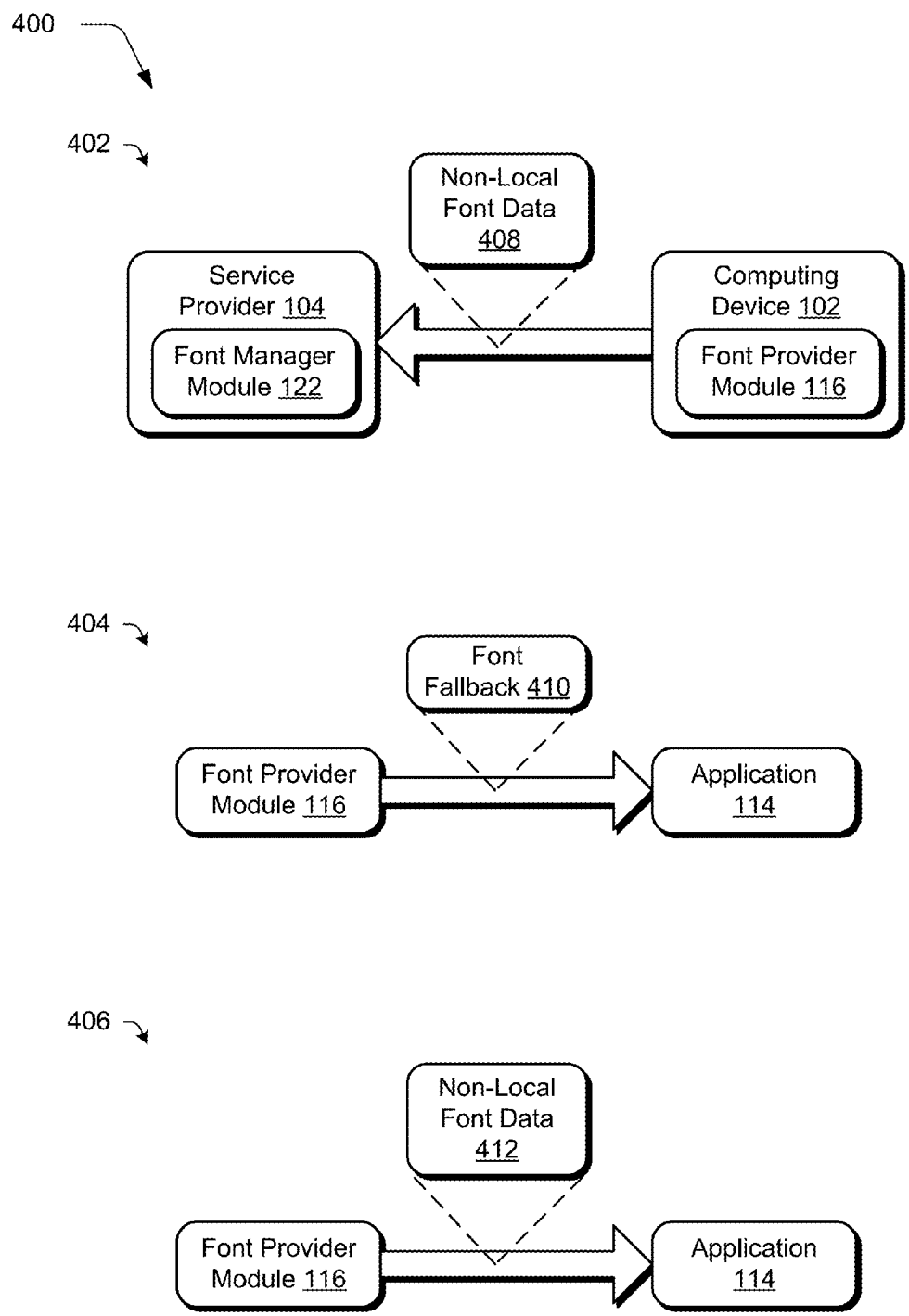
FIG. 4 depicts a system in an example implementation in which font fallback techniques are employed as part of font streaming and management.
Figure 5:
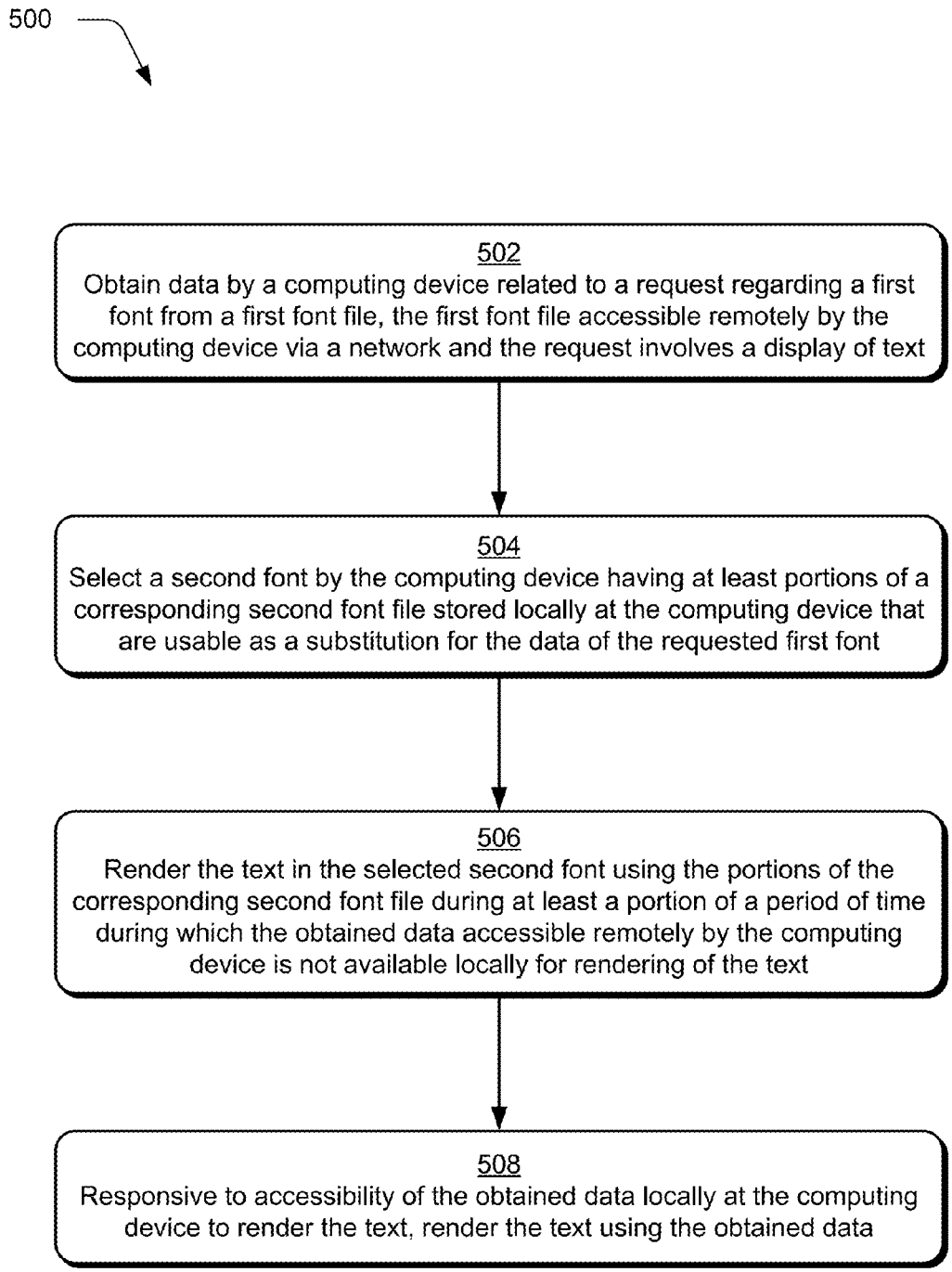
FIG. 5 is a flow diagram depicting a procedure in an example implementation in which a locally-available font is used as a substitute while a remote font is not available locally.

FIG. 4 depicts a system 400 in an example implementation in which font fallback techniques are employed as part of font streaming and management. The system 400 is illustrated using first, second, and third stages 402, 404, 406. FIG. 5 depicts a procedure 500 in an example implementation in which font fallback techniques are described in which a locally-available font is used as a substitute while a remote font is not available locally. Discussion of both of these figures is performed in parallel in the following. In the following, font fallback techniques are described in which a different font may be substituted if font data is not available locally until that data is made available locally to the computing device 102. This may be implemented in a variety of ways, such as in separate steps from font matching as described in FIGS. 2 and 3, may be performed as an integral part of font matching, and so on. For example, font fallback may occur after the conversion of characters to glyph IDs.

Data is obtained by a computing device related to a request regarding a first font from a first font file. The first font file is accessible remotely by the computing device via a network and the request involves a display of text (block 502). As shown at the first stage 402, the font provider module 116 may make a request for non-local font data 408 from the font manager module 112 of the service provider 104. The non-local font data 408 may be configured in a variety of ways, such as a font set 218 having font metadata 220, layout tables 228 used to identify glyphs and well as the identified glyphs 234 themselves, and so on. Thus, the font provider module 116 may request non-local font data 408 to be streamed via the network 106 from the service provider 104 to the computing device 102.

Streaming of this data may take an amount of time and as such, the non-local font data 408 may not be available locally at the computing device 102. Accordingly, a font fallback module 410 which is representative of functionality of the operating system 112 to perform font fallback 412 techniques as illustrated at the second stage 404. For example, the font fallback module 410 may select a second font having at least portions of a corresponding second font file stored locally at the computing device that are usable as a substitution for the data of the requested first font (block 504). This may include a substituted font file, glyphs, and so on. The text is rendered in the selected second font using the portions of the corresponding second font file during at least a portion of a period of time during which the obtained data accessible remotely by the computing device is not available locally for rendering of the text (block 506). In this way, a user is not forced to wait until the non-local font data 408 is made available but rather may view the text immediately by leveraging the second font file.

At the third stage 408, the non-local font data 414 is made available locally at the computing device 102, and thus may be provided by the font fallback module 410 to the application 114. Thus, responsive to accessibility of the obtained data locally at the computing device to render the text, the text is rendered using the obtained data (block 508). The application 114, for instance, may provide this non-local font data 412 for rendering by the operating system 112. Other examples are also contemplated in which the applications 114 are not made aware of this substitution and rather this fallback functionality is abstracted away as part of the operating system 112.

Thus, font fallback may occur for reasons of locality. If a best matching font file is remote (i.e., not in the font cache) via the network 106 then a local fallback font is selected instead by the font provider module 116. A font may also be partially remote. That is, some parts of the file may be local (in the font cache 120) while others are remote, e.g., not in the font cache 120. If so, the font fallback module 410 queries the font cache module 118 to detect whether the parts of the font file that are used to draw the specified characters of the text are cached locally and a fallback font is selected to draw the nonlocal characters.

Fallback may also occur after the conversion of characters to glyphs, in which case the font cache module 118 determines whether the identified glyphs are local and falls back if not. In any case where fallback occurs due to locality, a download request may be created that includes an identity of the font as well as identified remote characters or glyphs. The download request may then be added to a font download queue passed to the font provider module 116.

Note that the above process does not block download of data. This ensures that drawing text is efficient, though the text may be drawn in a different font than requested. If fallback due to lack of locality occurs, download requests are added to the font download queue as a side-effect. At a convenient time, the application 114 (or font provider module 116) may request that the queued download requests be executed. The font provider module 116 then downloads the requested font data in the background and caches it in the font cache 120 through use of the font cache module 118. The application 114 may be notified when the download completes, at which time the application 114 may cause the text to be drawn using the newly local data.

For example, an application 114 might draw an entire page of text in a variety of fonts. Some the text on the page may use remote fonts, characters, or glyphs, in which case local fallback fonts are used and download requests are added to the font download queue. After drawing the page, the application 114 requests execution of download requests in the queue of the font provider module 116. The font provider module 116 then downloads the data in the background and caches it in the font cache 120. The application 114 is notified when the download completes, at which time it redraw the page. On the second drawing pass, each of the requested characters and glyphs are local and thus fallback does not occur.

Returning again to FIG. 1, a font provider module 116 is a component that is used by the font cache module 118 and font cache 120 to download font set metadata and font file data from font files 124 of the service provider 104. The font cache module 118 may include a list of available providers. These may include built-in providers that are part of the font streaming implementation, pluggable providers that are added through an installation mechanism, or both. Each provider is identified by a provider ID, which may be an integer, a GUID, a string, or other unique value. Given a provider ID, the font cache module 118 may instantiate the corresponding provider and use its functionality by calling methods or some other mechanism such as message passing.

A font provider module 116 may be implemented in a same process as the font cache module 118 or in a separate process.

A font provider module 116 may be configured to implement a well-defined interface with having a variety of functions, the first of which is initializing a font set 218. A font set 218 is identified by a provider ID and a provider-defined key. For example, if a font provider module 116 enables users to purchase or otherwise acquire fonts, the font set key may include the user's account name. If each font provider module 116 is configured to have a single font set, a font streaming implementation may omit the concept of provider-defined font set keys.

A procedure for initializing a font set may include the following:
1. The font cache instantiates the font provider using the provider ID.
2. The font cache calls a provider method, specifying the font set key.
3. The font provider downloads metadata from a web service or other font source, using whatever protocol is required by the service.
4. The provider parses the data returned by the font source, and calls back to a font set "builder" interface implemented by the font cache. For each font, the provider specifies the font's identity (e.g., a provider-defined file key and face index) along with associated font properties.
5. When the provider is done, the font cache uses the information returned via the builder interface to construct an internal representation of the font set.

As should be readily apparent variations on the above are also contemplated. For example, instead of downloading information directly in step 2, the font provider module 116 may return download information (e.g., URI, etc.) to the font cache module 118, which would execute the download and pass the results back to the provider. Likewise, instead of calling back to a builder object in step 3, the font provider module 116 could convert the downloaded information to an agreed-upon format understood by the font cache module 118.

A second function of a font provider module 116 is to download font file data from font files 124. A font file 124 is identifiable by a provider ID and a provider-defined file key. Note that the file key may originate from the font provider module 116 itself during construction of the font set. Formats may also enable multiple fonts to be packages in one file (e.g., TrueType collections), so a font may be identified by a font file reference plus a face index.

Ranges of bytes in a remote font file are downloaded as follows:
1. The font cache instantiates the font provider using the provider ID.
2. If the size of the file is not already known, the font cache module 118 calls a provider method to get the file size. The method takes the provider-defined file key. The font provider module 116 may determine the file size by sending an HTTP HEAD request to a web service. Or, if the file size was known during the construction of the font set, the font provider module 116 may encode the size as part of the file key.
3. The font cache module 118 calls a provider method to get download information. The method takes a provider-defined file key and a callback interface. The font provider module 116 returns download information such as a URI, authentication information, etc., via the callback interface.

4. Using the returned download information, the font cache downloads the desired file ranges and caches them.

As should be readily apparent, variations on the above are also contemplated. For example, the font provider module 116 may download the data itself into a buffer provided by the font cache module 118.

In addition to the functions described above, the provider interface may include mechanisms whereby a font provider module 116 may ensure that obsolete data is discarded from the font cache 120. For example, a font set may include an expiration date after which the font cache 120 discards or reinitializes the font set, a font provider module 116 may programmatically notify the font cache module 118 when a font set or other resource is out of date, and so forth.

If per-user or per-application data is supported, the font provider module 116 interface may include a mechanism whereby a font provider module 116 can limit access to downloaded data. For example, a font set builder interface may include a method for setting a discretionary access control list (DACL) on the font set. The font cache module 118 may then expose the font set to application processes with the specified access.

The font cache module 118 and associated font cache 120 are the components responsible for downloading data and caching the result. The font cache module 118 downloads data with the help of font providers. The font cache 120 and font cache module 118 may be used to:

Access a cached font set.
Requested that a font set be downloaded.
Query the locality of a font file (i.e., remote, local, or partial).
Query the locality of parts of a font file.
Request that parts of a font file be downloaded.

The font cache module 118 and font cache 120 may be implemented as a dedicated system component such that multiple applications 114 share the same font cache 120. That way, if multiple applications 114 request the same data, the data is downloaded once and a single copy of the data is cached.

In one or more implementations, applications 114 do not interact directly with the font cache 120 but go through a font support library. The font support library exposes higher level interfaces used for font matching, text layout, text rendering, and so on. Use of a font download queue and smart character and glyph caching described later may also be thought of as parts of the font support library. The font support library resides in application processes and interacts with the font cache module 118 through a private inter-process communication mechanism. Alternatively, both the font support library and font cache module 118 and font cache 120 may be implemented in kernel mode, in which case the font support library may call the font cache directly.

The font support library exposes font sets to applications 114 via a high-level interface. An application 114 gets a font set by specifying a provider ID and font set key. Or an implementation may include a concept of a default "system" font set, in which case no parameters are used. The font support library calls or sends a message to the font cache module 118, which returns a handle to read-only shared memory that contains the internal binary representation of the font set in the font cache 120. If the font set is not cached then no font set is returned but a download is initiated.

The font cache 120 saves the binary font set data as a file, or as a record in a larger file. The binary representation includes records for each font with references to font properties. The binary representation may also include lookup tables to enable fonts to be quickly found based on a property, such as a family name, e.g., via a hash table lookup or binary search. In one or more implementations, the binary format is not exposed directly to applications. Instead, the font support library provides methods to enumerate fonts, find fonts, get font properties, and so on.

As an alternative to a binary format, the font cache module 118 and font cache 120 may serialize the font set to an XML file or similar format and read it into memory 110 as desired. Or the font set may be stored in a SQL database or something similar. In either case, the font cache module 118 does not share the font set with the font support library as a monolithic shared memory object. Instead, the font support library may forward individual method calls to the font cache module 118, which returns the results.

For each cached font file, the font cache module 118 creates a sparse file containing the font data. The file is divided into fixed-size chunks and uses a feature of some file systems to allocate storage solely for specified chunks. Separately from the font data itself, the font cache module 118 allocates an array of bits called a chunk map. The chunk map contains one bit for each chunk in the font. Each bit is zero if the corresponding chunk is remote and one if the corresponding chunk is local. The font cache module 118 may append the chunk map to the font data, store it as a parallel file or stream alongside the font data, or store all the chunk maps as records in a single file.

When the font cache module 118 downloads font data, it first writes to the data to the cached file in the font cache 120 and then sets the corresponding bits in the chunk map. To ensure data integrity in case of power loss or other abrupt termination, care may be taken to ensure that the font data itself is flushed to disk before the corresponding chunk map bits. After downloading data, the font cache module 118 also notifies any applications 114 (via the font support library) that were waiting for the download to complete.

The font support library accesses font data by sending a message to the font cache module 118 and gets back read-only shared memory objects for the cached font data and chunk map. In this way, the font support library can efficiently access font data and locality information without copying data.

Other designs are also contemplated. For example, the font cache module 118 may use file ranges instead of chunks. Instead of a sparse file, the font cache module 118 may append newly downloaded ranges to a file and maintain a mapping of logical file ranges to cached file offsets. In this case, the font support library may read data by sending individual messages to the font cache module 118, which copies the data to a buffer.

The font cache module 118 may employ techniques to limit the growth of the font cache 120. For example, the font cache module 118 may define a maximum total size and discard the least recently used font files as needed to stay under that limit.

A font download queue may be used to track of font, character, and glyph download requests. The contents of the font download queue may be represented as a hierarchical data structure with font files at the top level. Each file is identified by its provider ID and provider-defined file key. For each file, the queue records a set of file ranges and a set of fonts (each with its own face index). Each font has a set of characters and a set of glyph IDs.

When an application 114 initiates a download, the content of the font queue is assigned to a download operation and the queue returns to an empty state. The font support library executes the download operation and may indicate completion. The font support library may download each file in the queue, sequentially or in parallel, as follows:

1. Download the file header if it not already local. Inspect the header to determine the font format, e.g., OpenType or TrueType collection.
2. For each requested font in the file, get the face offset from the header and download the table directory if it not already local.
3. Examine the table directory and determine which tables can be sparse and which are to be downloaded in full. For example, an assumption may be made that the glyf table is sparse, as it typically accounts for 80% or more of the data in a TrueType font. The design may also be extended to other tables containing per-glyph data.
4. Download each of non-sparse tables that are not already local.
5. Parse enough of the font to compute the character to glyph map (cmap) and glyph dependency map (see below).
6. Convert each character request to a glyph request per the cmap. For character requests in certain Unicode ranges (such as Arabic), behave as if each of the characters in the range are requested.
7. For each glyph request, add requests to any other glyph IDs it may depend on, as specified by the glyph dependency map. Do this recursively.
8. Convert glyph requests to byte ranges using location data in the font (e.g., local table) and download each of the requested by ranges that are not already local.
9. Inspect each newly-downloaded glyph to determine if it is a TrueType composite. If so, ensure that its component glyphs are also local. A component glyph may itself be a composite so do this recursively.

Font streaming using smart character and glyph caching may be used to opportunistically download the font data that is likely involved in rendering a given set of characters (or glyphs) in a given font. To do so, the text layout module 228 may take into account each glyph substitution that may be performed during generation of the layout 230, plus any glyph substitutions that may be involved in rendering color glyphs. In this way, the application 114 may draw a page using two passes to render everything in the correct font. In the first pass, some fonts or characters may be remote, such that fallback occurs and character download requests are added to the queue as previously described. However, in the second pass (after download completion), each of the glyphs used to render the page are local and no fallback occurs.

To enable smart glyph caching, the font support library may construct a glyph dependency map when a font is downloaded for the first time. This occurs after the non-sparse tables are downloaded, and each of the tables used to construct the dependency map are non-sparse. The glyph dependency map is cached by the font cache 120.

A character is considered local when each the glyphs that it could directly or indirectly yield are local. Ensuring that a character is local, so that no errors occur when it comes time to actually use it, involves knowledge of the text layout process, as there are points at which a single character may produce different glyphs depending on a variety of factors, such as what its neighboring characters are, the reading direction, whether color is enabled, and whether it is a composite glyph. Accordingly, a single character may transform into any one of a dozen different possibilities after going through shaping, especially in complex fonts like Gabriola or Palatino with OpenType features applied.

Figure 6:
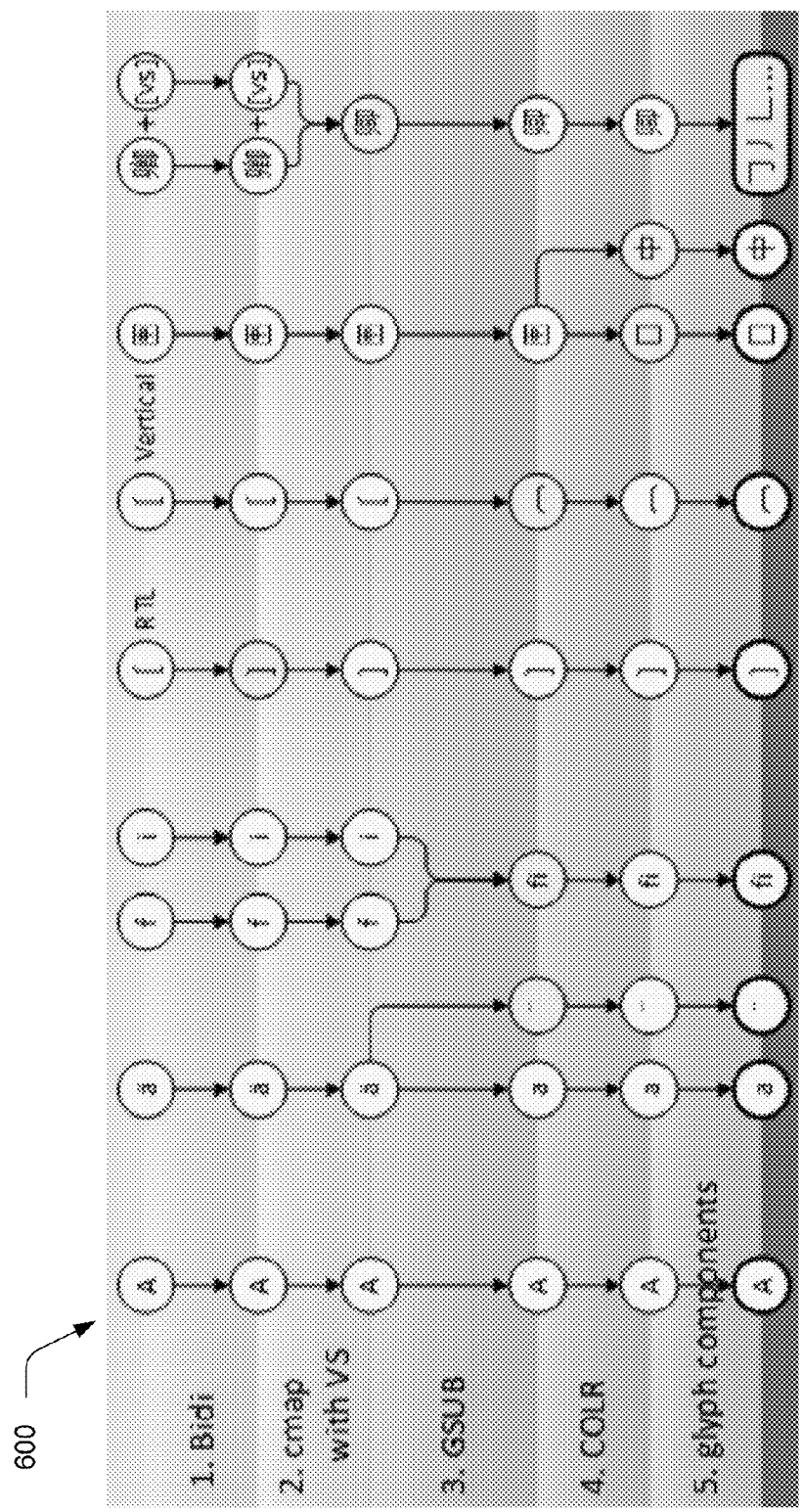
FIGS. 6 and 7 show examples of creation of dependency lists for a glyph dependency graph.

As shown in the example 600 of FIG. 6, the first step in layout is mirroring the Unicode character when the reading direction is reversed (such as RTL Hebrew) and the character has a mirror pair, such as the parentheses and brackets, e.g., "[ ] { } ( )" The Unicode character is then mapped to nominal glyph ID via the cmap table, or to a specific variant if a variation selector follows the base character, which is most common for CJK characters like '卿', but possible for math operators too such as "≥."

Shaping then applies each contextual lookup from the GSUB table, substituting potentially many glyphs due to ligatures, stylistic sets, glyph composition/decomposition, vertical substitution, and a number of other features. If a color font, a single glyph may be split into many colored glyph runs using the COLR table to map the base glyph id to a list of layered glyph components. Composite glyphs are split into separate components (common for CJK characters), though this is handled separately and not account for in the glyph dependency map.

Conceptually, the generation of the glyph dependencies to form a dependency graph starts with each character and follows each of the ways it may be composed into glyphs. This results in a directed acyclic graph with leaf nodes that may be clustered into equivalent classes of dependency lists, and the same resulting glyph ID potentially appearing in more than one dependency list but each nominal glyph having only one dependency list. The dependency list excludes any TrueType glyph components, since those cannot be known until the "glyf" table glyph record is hydrated which is used to identify component glyph IDs.

Because there is a likelihood that related characters may also be used for any given character, the download process may work at a larger granularity than single characters and rather may opportunistically pre-fetch entire Unicode blocks at a time. This may be used to avoid transient cases in connected scripts like Arabic and Devanagari when some letters are already present and neighboring letters of the same script are not yet, which could temporarily cause display of un-joined text until the new characters were downloaded. For much larger scripts like Han and Korean that involve blocks of thousands of characters, the request granularity may remain per-character, with any extra characters downloaded as a side effect of file chunk size.

Figure 7:
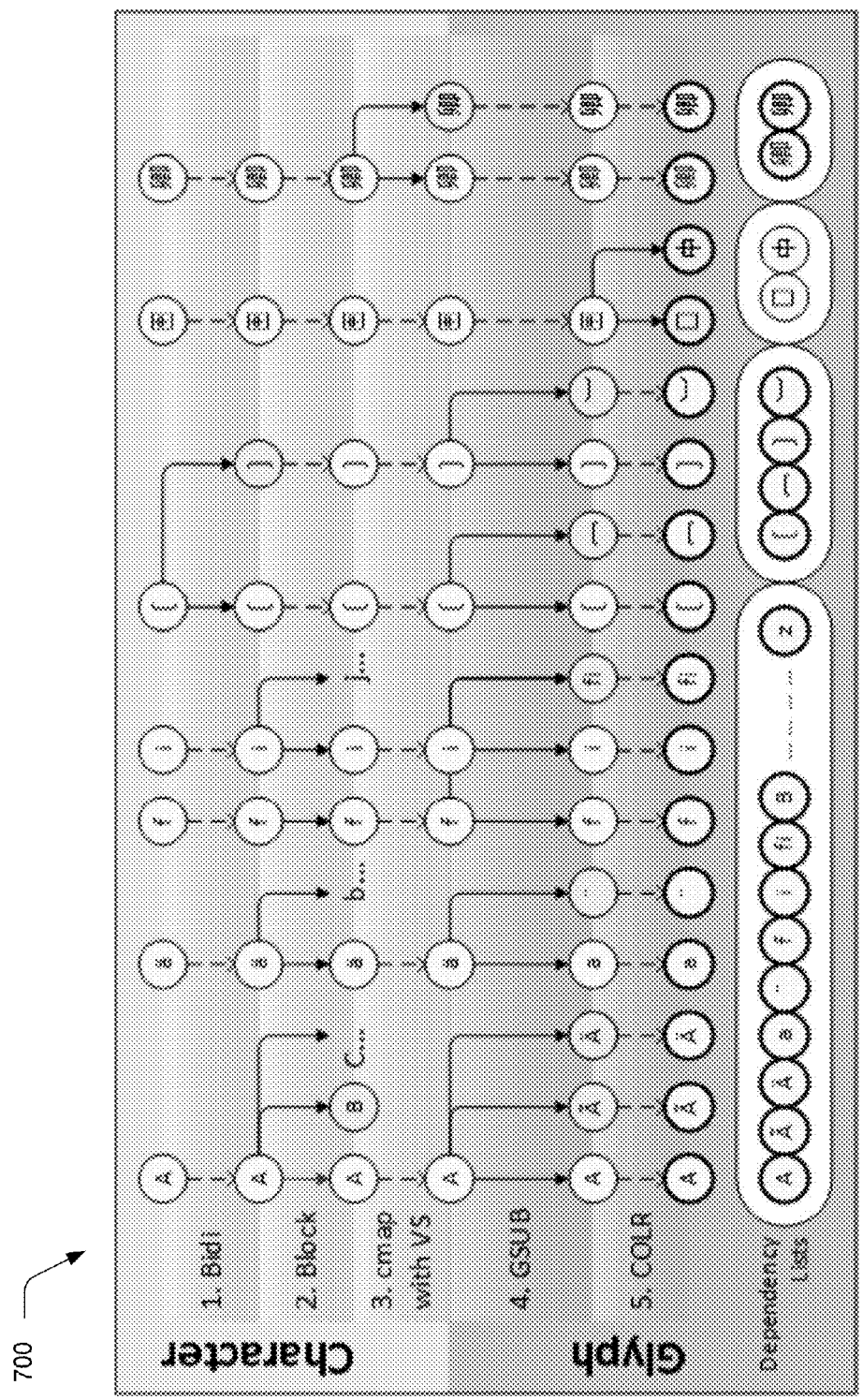

An example 700 of creation of a dependency graph is shown in FIG. 7. For each character supported in the font, the mirror pair is added to a dependency list in the dependency graph of the given character, if one exists ('['→'[' ']'; '}'→'{' '}'). Then, each of the other characters from the character's Unicode block are added, if the block is not a partially hydrated block like CJK and emoji. It may be noted that step one may become redundant in most instances as mirror pairs are typically found within the same block. Also, a small set of known script-specific characters may be added, such as the tatweel character for Arabic or Syriac, since downloading an entire block may not automatically grab these common script characters that are outside the block.

Next, the nominal glyph from the cmap is obtained along with any other variants. Each lookup in the GSUB is enumerated, which implicitly enumerates every script and language too, since lookups are lower level items than script and language and the logic appends the dependency list for each input and corresponding output glyphs.

Additionally, each glyph decomposed color glyph IDs are added using the COLR table. Then, recursive dependency lists are flattened into top level mappings, and identical lists combined. This produces an array mapping each nominal glyph ID to a dependency list, which is an ordered list of 16-bit glyph IDs. Any dependency lists having a single output glyph are omitted, and the array size may be smaller than the glyph count if trailing glyph IDs are single count lists.

Other examples are also contemplated. For example, smart character and glyph caching may be dispensed with and in such a case, the font download queue contains file range requests, not character and glyph requests. A file range request may be generated when, in the ordinary course of text formatting or rendering, the font support library attempted to read remote file data.

Example System and Device

Figure 8:
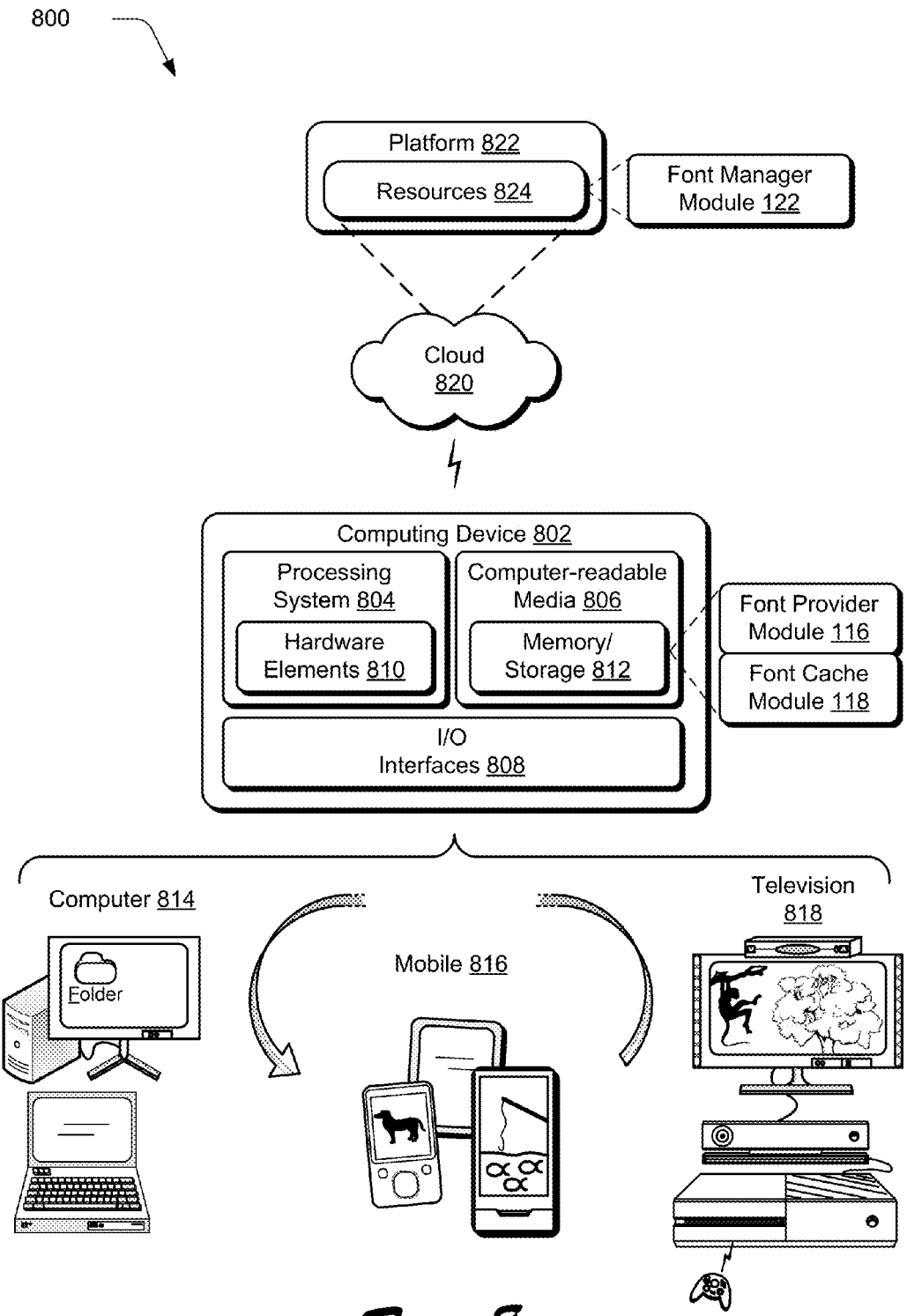
FIG. 8 illustrates an example system including various components of an example device that can be implemented as any type of computing device as described with reference to FIGS. 1-7 to implement embodiments of the techniques described herein.

FIG. 8 illustrates an example system generally at 800 that includes an example computing device 802 that is representative of one or more computing systems and/or devices that may implement the various techniques described herein. This is illustrated through inclusion of the font manager module 122, font provider module 116, and font cache module 118. The computing device 802 may be, for example, a server of a service provider, a device associated with a client (e.g., a client device), an on-chip system, and/or any other suitable computing device or computing system.

The example computing device 802 as illustrated includes a processing system 804, one or more computer-readable media 806, and one or more I/O interface 808 that are communicatively coupled, one to another. Although not shown, the computing device 802 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 804 is representative of functionality to perform one or more operations using hardware. Accordingly, the processing system 804 is illustrated as including hardware element 810 that may be configured as processors, functional blocks, and so forth. This may include implementation in hardware as an application specific integrated circuit or other logic device formed using one or more semiconductors. The hardware elements 810 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 806 is illustrated as including memory/storage 812. The memory/storage 812 represents memory/storage capacity associated with one or more computer-readable media. The memory/storage component 812 may include volatile media (such as random access memory (RAM)) and/or nonvolatile media (such as read only memory (ROM), Flash memory, optical disks, magnetic disks, and so forth). The memory/storage component 812 may include fixed media (e.g., RAM, ROM, a fixed hard drive, and so on) as well as removable media (e.g., Flash memory, a removable hard drive, an optical disc, and so forth). The computer-readable media 806 may be configured in a variety of other ways as further described below.

Input/output interface(s) 808 are representative of functionality to allow a user to enter commands and information to computing device 802, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 802 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 802. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 802, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 810 and computer-readable media 806 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 810. The computing device 802 may be configured to implement particular instructions and/or functions corresponding to the software and/or hardware modules. Accordingly, implementation of a module that is executable by the computing device 802 as software may be achieved at least partially in hardware, e.g., through use of computer-readable storage media and/or hardware elements 810 of the processing system 804. The instructions and/or functions may be executable/operable by one or more articles of manufacture (for example, one or more computing devices 802 and/or processing systems 804) to implement techniques, modules, and examples described herein.

As further illustrated in FIG. 8, the example system 800 enables ubiquitous environments for a seamless user experience when running applications on a personal computer (PC), a television device, and/or a mobile device. Services and applications run substantially similar in all three environments for a common user experience when transitioning from one device to the next while utilizing an application, playing a video game, watching a video, and so on.

In the example system 800, multiple devices are interconnected through a central computing device. The central computing device may be local to the multiple devices or may be located remotely from the multiple devices. In one embodiment, the central computing device may be a cloud of one or more server computers that are connected to the multiple devices through a network, the Internet, or other data communication link.

In one embodiment, this interconnection architecture enables functionality to be delivered across multiple devices to provide a common and seamless experience to a user of the multiple devices. Each of the multiple devices may have different physical requirements and capabilities, and the central computing device uses a platform to enable the delivery of an experience to the device that is both tailored to the device and yet common to all devices. In one embodiment, a class of target devices is created and experiences are tailored to the generic class of devices. A class of devices may be defined by physical features, types of usage, or other common characteristics of the devices.

In various implementations, the computing device 802 may assume a variety of different configurations, such as for computer 814, mobile 816, and television 818 uses. Each of these configurations includes devices that may have generally different constructs and capabilities, and thus the computing device 802 may be configured according to one or more of the different device classes. For instance, the computing device 802 may be implemented as the computer 814 class of a device that includes a personal computer, desktop computer, a multi-screen computer, laptop computer, netbook, and so on.

The computing device 802 may also be implemented as the mobile 816 class of device that includes mobile devices, such as a mobile phone, portable music player, portable gaming device, a tablet computer, a multi-screen computer, and so on. The computing device 802 may also be implemented as the television 818 class of device that includes devices having or connected to generally larger screens in casual viewing environments. These devices include televisions, set-top boxes, gaming consoles, and so on.

The techniques described herein may be supported by these various configurations of the computing device 802 and are not limited to the specific examples of the techniques described herein. This functionality may also be implemented all or in part through use of a distributed system, such as over a "cloud" 820 via a platform 822 as described below.

The cloud 820 includes and/or is representative of a platform 822 for resources 824. The platform 822 abstracts underlying functionality of hardware (e.g., servers) and software resources of the cloud 820. The resources 824 may include applications and/or data that can be utilized while computer processing is executed on servers that are remote from the computing device 802. Resources 824 can also include services provided over the Internet and/or through a subscriber network, such as a cellular or Wi-Fi network.

The platform 822 may abstract resources and functions to connect the computing device 802 with other computing devices. The platform 822 may also serve to abstract scaling of resources to provide a corresponding level of scale to encountered demand for the resources 824 that are implemented via the platform 822. Accordingly, in an interconnected device embodiment, implementation of functionality described herein may be distributed throughout the system 800. For example, the functionality may be implemented in part on the computing device 802 as well as via the platform 822 that abstracts the functionality of the cloud 820.

CONCLUSION

Although the example implementations have been described in language specific to structural features and/or methodological acts, it is to be understood that the implementations defined in the appended claims is not necessarily limited to the specific features or acts described. Rather, the specific features and acts are disclosed as example forms of implementing the claimed features.

What is claimed is:

1. A method comprising:
   obtaining, by a computing device and via a network, one or more layout tables that correspond to a font associated with a request to render text using the font;
   generating, by the computing device, a dependency graph by mapping input glyphs to output glyphs using the one or more layout tables;
   generating, by the computing device, a layout of the text using the dependency graph to identify glyphs that are involved in rendering the text;
   obtaining, by the computing device and via the network, the identified glyphs from a font file located remotely from the computing device without obtaining other glyphs that are not involved in rendering the text;
   selecting, by the computing device as a font fallback, another font having at least portions of another font file that is stored locally at the computing device and that is usable as a substitution for the font;

rendering, by the computing device, at least a portion of the text in the selected other font using the portions of the other font file during a temporary period of time when the identified glyphs are being obtained by the computing device via the network; and rendering, by the computing device, the text using the identified glyphs.

2. A method as described in claim 1, further comprising performing font matching by the computing device by searching at least one font set to find metadata that corresponds to the font and wherein the obtaining of the one or more layout tables is performed based on the metadata.

3. A method as described in claim 2, wherein the metadata includes at least one of the following: family names, weights, sizes, typographic features, alignments, shapes, context-based substitutions, geometric descriptions, or styles for respective fonts.

4. A method as described in claim 1, wherein the generating of the dependency graph uses at least one dependency list.

5. A method as described in claim 1, wherein the generating of the dependency graph includes computation of at least one of glyph positions in the layout of the text, glyph substitutions, scripts, line breaking, glyph addition, or justification.

6. A method as described in claim 1, wherein the obtaining of the identified glyphs is performed as a file range request that specifies one or more ranges of glyphs in the font file based at least in part on the dependency graph.

7. A method as described in claim 1, wherein the identified glyphs specify a shape of respective glyphs outline as a series of curves or hinting instructions usable to optimize the shape for different sizes or resolutions.

8. A method as described in claim 1, wherein the obtaining of the one or more layout tables by the computing device via the network is separate from the obtaining of the identified glyphs.

9. A method as described in claim 1, further comprising storing at least one of the one or more layout tables and the identified glyphs locally by the computing device in a cross-process font cache.

10. A method as described in claim 9, wherein the storing includes storing at least one of the one or more layout tables or the identified glyphs in a sparse file that has portions allocated that contain corresponding portions of the one or more layout tables or the identified glyphs.

11. A method comprising:

receiving, at a computing device, a request to display text in a first font from a first font file, the first font file accessible remotely by the computing device via a network;

accessing, by the computing device and via the network, the first font file to obtain data related to the first font;

selecting, by the computing device as a font fallback, a second font having at least portions of a corresponding second font file that is stored locally at the computing device and that is usable as a substitution for the data related to the first font;

rendering at least a portion of the text in the selected second font using the portions of the corresponding second font file during a temporary period of time when the data related to the first font is being obtained by the computing device via the network; and based at least in part on the data related to the first font being obtained locally at the computing device, rendering the portion of the text using the obtained data related to the first font.

12. A method as described in claim 11, wherein the data comprises one or more layout tables or metadata that includes at least one of the following: family names, weights, sizes, typographic features, alignments, shapes, context-based substitutions, geometric descriptions, or styles for the first font specified in the first font file.

13. A method as described in claim 11, wherein the data comprises characters of the first font from the first font file.

14. A method as described in claim 11, wherein the data comprises glyphs identified from a layout of the text.

15. A method as described in claim 11, wherein selecting the second font causes at least one download request to be added to a font download queue.

16. A method as described in claim 11, further comprising, prior to the data related to the first font being obtained, rendering the text using multiple different fonts that are available to the computing device.

17. A system comprising:

one or more processors; and memory storing instructions that, when executed by the one or more processors, cause the one or more processors to:

based on a received request to display text in a first font from a first font file, remotely access, via a network, the first font file to obtain data related to the first font;

select, as a font fallback, a second font having at least portions of a corresponding second font file that is stored locally at the system and that is usable as a substitution for the data related to the first font;

render at least a portion of the text in the selected second font using the portions of the corresponding second font file during a temporary period of time when the data related to the first font is being obtained via the network; and based at least in part on the data related to the first font being obtained locally at the system, render the portion of the text using the obtained data related to the first font.

18. A system as described in claim 17, wherein the instructions further cause the one or more processors to, prior to the data related to the first font being obtained, render the text using multiple different fonts that are available.

19. A system as described in claim 17, wherein the data comprises one or more layout tables or metadata that includes at least one of the following: family names, weights, sizes, typographic features, alignments, shapes, context-based substitutions, geometric descriptions, or styles for the first font specified in the first font file.

20. A system as described in claim 17, wherein selecting the second font causes at least one download request to be added to a font download queue.

* * * * *